United States Patent [19]

Lilley et al.

[11] Patent Number: 4,702,077
[45] Date of Patent: Oct. 27, 1987

[54] MASTER CYLINDER FOR VEHICLE BRAKING SYSTEM

[75] Inventors: Eric M. Lilley; David J. Parker, both of Solihull, England

[73] Assignee: Lucas Industries, Birmingham, England

[21] Appl. No.: 879,496

[22] Filed: Jun. 24, 1986

Related U.S. Application Data

[63] Continuation of Ser. No. 575,564, Jan. 31, 1984, abandoned.

[30] Foreign Application Priority Data

Feb. 15, 1983 [GB] United Kingdom ............... 8304108

[51] Int. Cl.<sup>4</sup> ............................................. B60T 11/08
[52] U.S. Cl. ......................................... 60/578; 60/588; 92/169
[58] Field of Search ............... 60/574, 578, 585, 592, 60/588; 92/169.2

[56] References Cited

U.S. PATENT DOCUMENTS

| | | | |
|---|---|---|---|
| 2,093,543 | 9/1937 | Bowen | 60/578 |
| 2,197,681 | 4/1940 | Bowen | 60/578 |
| 2,230,419 | 2/1941 | White | 60/578 |
| 2,374,235 | 4/1945 | Roy | 60/578 |
| 2,518,821 | 8/1950 | Roy | 60/578 |
| 2,746,574 | 5/1956 | Smith | 60/585 |
| 3,166,907 | 1/1965 | Randol | 60/578 |
| 3,186,174 | 6/1965 | Hayman | 60/578 |
| 4,347,779 | 9/1982 | Belart | 60/588 |
| 4,364,231 | 12/1982 | Dwyer | 60/578 |
| 4,398,390 | 8/1983 | Gaiser | 60/578 |
| 4,467,605 | 8/1984 | Smith | 60/578 |

FOREIGN PATENT DOCUMENTS

| | | | |
|---|---|---|---|
| 424676 | 2/1935 | United Kingdom | 60/578 |
| 2060103 | 4/1981 | United Kingdom | 60/578 |
| 2082277 | 3/1982 | United Kingdom | 60/588 |
| 2102517 | 2/1983 | United Kingdom | 60/578 |

Primary Examiner—Abraham Hershkovitz
Attorney, Agent, or Firm—Holman & Stern

[57] ABSTRACT

A master cylinder of the quick-fill type has an open-ended pressure cylinder closed by a closure member and a reservoir mounted on the cylinder. The closure member partially defines a quick-fill chamber in which slides a piston connected to a piston of the pressure cylinder. A valve controls communication between the quick-fill chamber and the reservoir.

18 Claims, 3 Drawing Figures 4,702,077

MASTER CYLINDER FOR VEHICLE BRAKING SYSTEM

This is a continuation of application Ser. No. 575,564, filed Jan. 31, 1984 now abandoned.

BACKGROUND OF THE INVENTION

1. Field of the Invention

This invention relates to a master cylinder of the "quick-fill" type, primarily for use in a vehicle braking system. Such a master cylinder is one which, when actuated, initially expells a large quantity of fluid into the braking system to cause rapid take-up of brake clearances and thereby minimize the amount of brake pedal travel required for this purpose. Examples of quick-fill master cylinders are described in our published co-pending patent application No. 2,074,675.

DESCRIPTION OF THE PRIOR ART

Master cylinders have been proposed having a pressure cylinder with an open end which is closed by a closure member mounted on the cylinder over said open end. Examples of such a master cylinder are described in our published co-pending patent application No. 2,082,277.

There is an increasing trend in modern vehicle braking systems to use fabricated master cylinders in which the pressure cylinder is a simple steel tube of relatively thin uniform wall thickness, with a separate reservoir, usually of plastics material, mounted on the cylinder and communicating with the interior of the latter through transverse ports formed in the cylinder wall. The provision of a quick-fill facility in a master cylinder of this kind gives rise to considerable problems because a large chamber has to be provided for the low pressure quick-fill fluid, as well as valve means to control the operation of the quick-fill chamber, and there is insufficient material available in the components of the master cylinder to enable such items to be incorporated in the structure of the master cylinder.

BRIEF SUMMARY OF THE INVENTION

It is, therefore, an object of the present invention to provide means for incorporating a quick-fill facility primarily, but not exclusively, in a fabricated master cylinder.

According to one aspect of the present invention, a master cylinder of the quick-fill type comprises a pressure cylinder having an open end, a reservoir communicating with the pressure cylinder, a closure member arranged to close said cylinder open end, the closure member at least partially defining a quick-fill chamber, pistons slidable respectively in the pressure cylinder and quick-fill chamber, and valve means arranged and operable to control communication between the quick-fill chamber and the reservoir.

In one convenient arrangement, the quick-fill chamber piston forms an end wall of the closure member. This piston may conveniently be carried by, and is preferably fast for axial movement with, a rearwardly extending support member connected to the pressure chamber piston. Such support member is preferably hollow and surrounds at least part of an actuating rod for the pressure chamber piston.

The valve means is preferably contained within a recess formed at least partially by the reservoir, the valve means being contained either within a separate housing member lodged in the recess, or within a compartment defined by the recess itself. The valve means may conveniently communicate with the quick fill chamber via a passageway which extends axially of the cylinder and is preferably defined, at least partially, by the closure member.

BRIEF DESCRIPTION OF THE DRAWINGS

The invention will now be described, by way of example, with reference to the accompanying drawings wherein.

DETAILED DESCRIPTION

Figure 1:
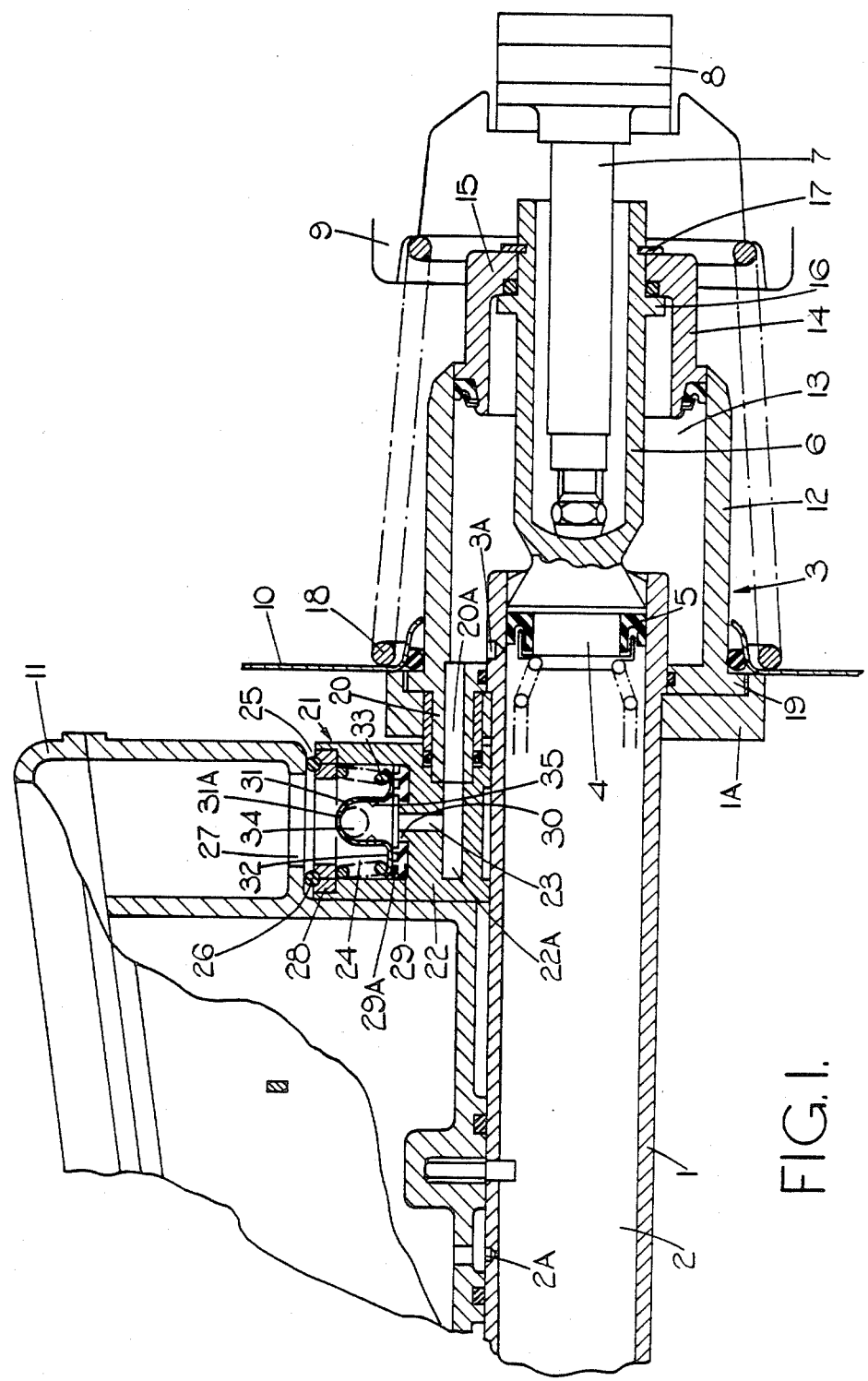
FIG. 1 is a longitudinal cross-sectional view of part of one form of the master cylinder of the invention.

FIG. 1 of the drawings illustrates part of a tandem master cylinder for use in a dual circuit braking system and comprising a pressure cylinder 1, shown as a thin-walled tube of uniform wall thickness having an axial blind bore 2, the open end of which is closed by a closure member indicated generally at 3. The internal components of the pressure cylinder are conventional and have not be shown in detail. However, the rearmost one 4 of a pair of pistons within the bore 2 is illustrated, the piston 4 being provided with a seal 5 and having a rearwardly extending sleeve 6 through which extends an actuating rod 7 connected, in conventional manner, to an actuating member 8 of a booster, of which a power piston hub is indicated at 9 and a body shell portion at 10. A reservoir 11 is mounted at the upper side of the cylinder 1 and communicates respectively with the internal chambers of the cylinder through ports 2A and 3A formed transversely through the cylinder wall.

The closure member 3 includes a sleeve 12 of relatively large diameter compared with the pressure cylinder 1 and partially defining a quick-fill chamber 13 having a relatively large volume. The open end of the sleeve 12 is closed by a cup like piston 14 slidable within the sleeve 12, the base 15 of the piston 14 being apertured to receive the rear end portion of the sleeve 6 therethrough. The base 15 is held captive between a radial shoulder 16 of the sleeve 6 and a circlip 17 lodged in a groove in the sleeve 6. Thus, it will be seen that the pistons 4 and 14 move together as a unit in response to actuating force transmitted via the rod 7.

The closure member 3 is retained in position against a fixing flange 1A of the pressure cylinder 1 by means of the booster body shell 10 which is itself clamped against the flange by a spring 18 forming part of the booster mechanism and traps a shoulder 19 of the sleeve 12 between itself and the flange 1A. The sleeve 12 has an axial tubular extension 20 of which a bore 20A provides communication between the quick-fill chamber 13 and control valve means 21 for controlling operation of the quick-fill chamber. The extension 20 sealingly engages within a housing 22 of the valve means and the passage 20A is continued by a corresponding passage 22A within the housing 22, a branch 23 leading to a valve chamber 24. The housing 22 is lodged within a recess 25 defined between the body of the reservoir 11 and the pressure cylinder 1, the housing being sealed to the reservoir by a sealing ring 26 engaging the reservoir around a port 27 of the reservoir and engaging a retaining ring 28 for the valve components which permits communication between the port 27 and valve chamber 24.

The valve means includes a valve mechanism which comprises a resilient annular seal 29 snugly fitted within an annular space formed between a central spigot 30 of the housing 22 and the inner wall of the valve chamber, a generally tubular valve member 31 having an outwardly projecting flange 32 which rests upon the valve member 29, and a spring 33 acting between the retaining ring 28 and the flange 32 to urge the valve member 31 into sealing engagement with the valve member 29. The upper end of the valve member 31, as seen in the drawing, has a port 31A therethrough around which is formed a valve seat for co-operation with a ball 34 which acts as a one-way valve, the ball being held captive within the valve member 31 by means of inwardly projecting tags 35 on the latter.

During actuation of the master cylinder, the pistons 4 and 14 move forward in unison from the positions illustrated and fluid is expelled by the piston 14 from the large volume quick-fill chamber 13. The strength of the spring 33 is chosen so that the pressure generated initially by the piston 14 is not large enough to lift the valve member 31 against the action of the spring 33. Since, however, the pressure causes the ball 34 to close the port 31A in the valve member 31, fluid from the quick-fill chamber is urged past the seal 5 of the piston 4 into the pressure chamber 2 and thence to the braking system so as rapidly to take up brake clearances in known manner. When pressure has built up in the chamber 2 to an extent preventing further flow of fluid into this chamber from the quick-fill chamber 13, the valve member 31 is lifted out of sealing engagement with the resilient valve member 29, thereby permitting fluid from the quick-fill chamber 13 to be expelled along the axial passage 20A past the valve member 31 and through the port 27 into the reservoir. The resilient valve member 29 is provided at its upper surface with a groove 29A, preferably of spiral configuration, to facilitate flow of fluid between the valve members 29 and 31. When the pistons 4 and 14 return towards their rest positions after braking, the ball 34 moves downwardly away from the port in the valve member 31 to the extent limited by the tags 35 and fluid is thereby permitted to be drawn from the reservoir into the quick-fill chamber.

Figure 2:
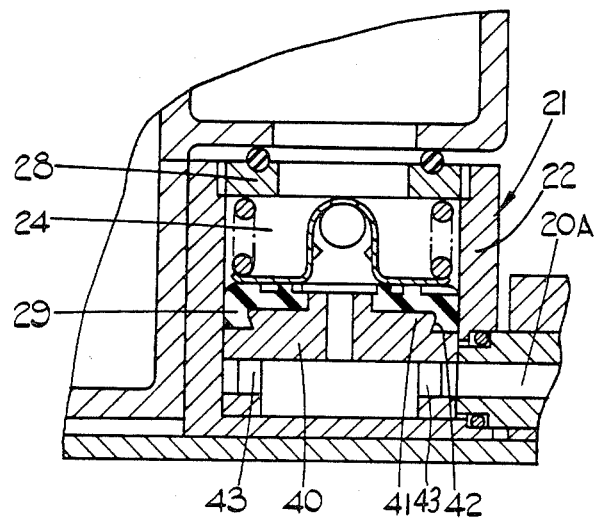
FIG. 2 is a longitudinal cross-sectional view of part of an alternative embodiment of the master cylinder of the invention.

FIG. 2 illustrates an alternative arrangement of valve mechanism 21, in which the arrangement and operation of the valve components is generally similar to that described in relation to FIG. 1, but differs in that the resilient valve member 29 forms a sub-assembly with a base member 40 upon which it is snap-engaged over a central boss 41 having undercut side edges 42. The base member 40 provides an extension 43 of the axially extending passage 20A of the closure member 12. In this embodiment, the valve components are placed in the valve chamber 24, through the upper end of the housing 22 before assembly of retaining ring 28' which, in this case forms a screw threaded connection with the housing.

Figure 3:
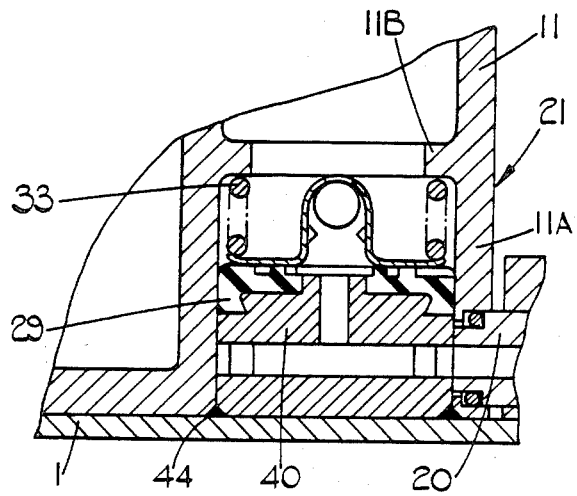
FIG. 3 is a view similar to FIG. 2 of part of a further embodiment of the master cylinder of the invention.

FIG. 3 shows a further alternative arrangement of the valve means 21. In this embodiment, the arrangement and operation of the valve components are identical with those of FIG. 2, but the separate housing 22 is dispensed with and the valve mechanism is housed, instead, within a compartment formed integrally as part of the reservoir body. For this purpose, an additional wall portion 11A is provided, extending downwardly into engagement with the pressure cylinder 1 and being apertured to receive the axially extending portion 20 of the closure element sleeve 12. This embodiment also makes use of a separate base member 40, upon which the resilient valve member 29 is retained in the manner described in FIG. 2. However, in this embodiment, the valve components are assembled into the compartment from below the reservoir and the base member 40, having been placed in the position illustrated, is then permanently secured to the reservoir by a weld 44 so that the valve means 21 and the reservoir now, together form a complete sub-assembly.

It will be seen that the invention provides a simple and convenient means of incorporating a quick-fill chamber and its associated piston and valve components into a master cylinder which is particularly convenient for use with fabricated master cylinders, although it may, of course, be used with other master cylinders embodying an end closure means.

We claim:

1. A master cylinder of the quick-fill type comprising:
    an elongated tubular pressure cylinder having a relatively thin uniform wall thickness along substantially its entire length and an open end;
    a main piston operatively slidably mounted within said pressure cylinder;
    a separate closure member having an inner end mounted on said open end of said tubular pressure cylinder partially enclosing said open end, said closure member extending axially outwardly from said open end of said pressure cylinder and having an outer end;
    a cylindrical bore in said closure member communicating adjacent one end with said open end of said tubular pressure cylinder and at least partially defining a quick-fill chamber;
    a quick-fill piston operatively slidably mounted within said cylindrical bore defining said quick-fill chamber and extending in the non-actuated rest position axially outwardly beyond said outer end of said closure member;
    a separately made independent fluid reservoir member mounted on the outer wall of said tubular pressure cylinder;
    means for connecting said pressure cylinder with the interior of said reservoir member to facilitate flow of fluid therebetween;
    fluid flow channel means connecting said quick-fill chamber to the interior of said reservoir member; and
    valve means operatively mounted in said channel means for controlling the flow of fluid between said quick-fill chamber and said reservoir.

2. A master cylinder as claimed in claim 1 wherein:
    said cylindrical bore is open at the other end thereof; and
    said quick-fill piston closes said other end of said cylindrical bore to form an end wall of said closure member.

3. A master cylinder as claimed in claim 1 wherein:
    said quick-fill piston is operatively connected to said main piston for simultaneous axial movement therewith.

4. A master cylinder as claimed in claim 2 wherein:
    said quick-fill piston comprises a separate member operatively and removably connected to said piston for simultaneous axial movement therewith.

5. A master cylinder as claimed in claim 3 wherein:

an axially extending support member is provided on said main piston; and said quick-fill piston is connected to said axially extending support member for guiding and supporting said main piston.

6. A master cylinder as claimed in claim 5 wherein:

a radially outwardly extending flange is provided on said support member;

a radially inwardly extending flange is provided on said quick-fill piston; and a retaining clip is provided on said support member for removably retaining said flange on said quick-fill piston between said retaining ring and said flange on said support member.

7. A master cylinder as claimed in claim 6 wherein:

an actuating rod is provided connected at one end to said main piston; and said support member comprises a hollow sleeve member surrounding at least part of said actuating rod.

8. A master cylinder as claimed in claim 1 wherein:

said reservoir member is shaped to form a recess in the outer surface thereof; and said valve means is mounted in said recess.

9. A master cylinder as claimed in claim 8 wherein said valve means comprises:

a separate valve housing mounted within said recess;

a valve seat mounted in said housing; and a movable valve member cooperatively engageable with said valve seat.

10. A master cylinder as claimed in claim 1 wherein said channel means comprises:

a passageway extending through said closure member and said valve means parallel to the axis of said tubular pressure cylinder.

11. A master cylinder as claimed in claim 9 wherein:

said valve housing is mounted between said tubular pressure cylinder and said reservoir member.

12. A master cylinder as claimed in claim 1 wherein:
said quick-fill piston is hollow and has an inner surface having a diameter larger than the external diameter of the adjacent end portion of said pressure cylinder, so that said quick-fill piston is axially displaceable over a part of the length thereof over said adjaent end portion of said pressure cylinder.

13. A master cylinder as claimed in claim 4 wherein:
said quick-fill piston is hollow and has an inner surface having a diameter larger than the external diameter of the adjacent end portion of said pressure cylinder, so that said quick-fill piston is axially displaceable over a part of the length thereof over said adjacent end portion of said pressure cylinder.

14. A master cylinder as claimed in claim 6 wherein:
said quick-fill piston is hollow and has an inner surface having a diameter larger than the external diameter of the adjacent end portion of said pressure cylinder, so that said quick-fill piston is axially displaceable over a part of the length thereof over said adjacent end portion of said pressure cylinder.

15. A master cylinder as claimed in claim 14 wherein:

said reservoir member is shaped to form a recess in the outer surface thereof; and said valve means is mounted in said recess.

16. A master cylinder as claimed in claim 15 wherein said valve means comprises:

a separate valve housing mounted within said recess;

a valve seat mounted in said housing; and a movable valve member cooperatively engageable with said valve seat.

17. A master cylinder as claimed in claim 16 wherein said channel means comprises:

a passageway extending through said closure member and said valve means parallel to the axis of said tubular pressure cylinder.

18. A master cylinder as claimed in claim 17 wherein:

said valve housing is mounted between said tubular pressure cylinder and said reservoir member.

* * * * *